Sept. 30, 1969  M. GUADALUPI  3,470,247
PROCESS FOR THE PRODUCTION OF UREA BY SYNTHESIS OF AMMONIA
AND CARBON DIOXIDE, WITH TOTAL RECYCLING OF THE PORTION
WHICH HAS NOT BEEN CONVERTED INTO UREA
Filed March 3, 1965
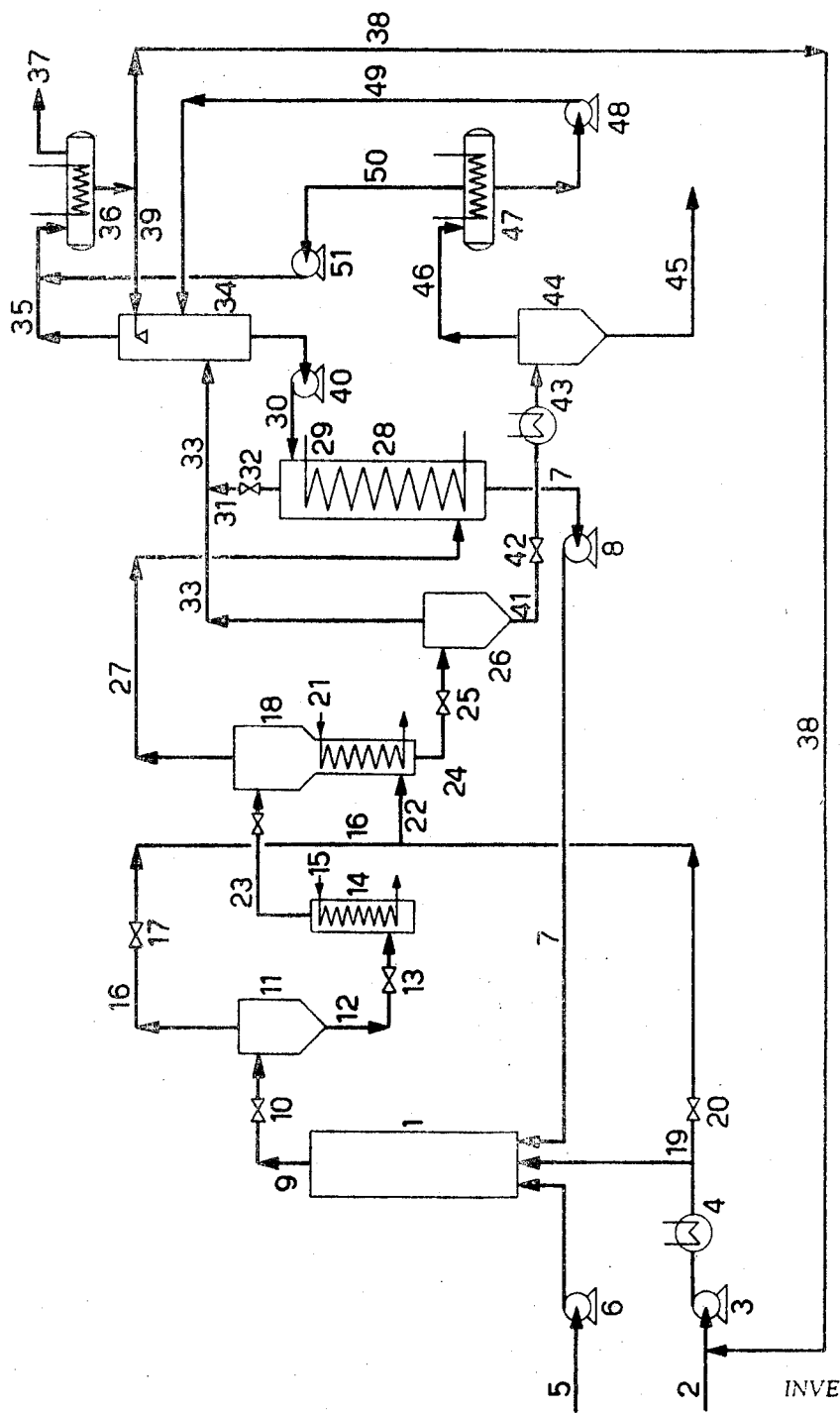
INVENTOR
*Mario Guadalupi*
BY
*B. E. Schlesinger*
Attorney United States Patent Office 3,470,247
Patented Sept. 30, 1969

3,470,247
PROCESS FOR THE PRODUCTION OF UREA BY SYNTHESIS OF AMMONIA AND CARBON DIOXIDE, WITH TOTAL RECYCLING OF THE PORTION WHICH HAS NOT BEEN CONVERTED INTO UREA
Mario Guadalupi, Milan, Italy, assignor to Snam S.p.A., Milan, Italy, a company of Italy
Filed Mar. 3, 1965, Ser. No. 436,769
Claims priority, application Italy, Sept. 8, 1964, 50,979/64
Int. Cl. C07c *127/04*
U.S. Cl. 260—555   6 Claims

ABSTRACT OF THE DISCLOSURE

This is a process for producing urea by synthesis from ammonia and carbon dioxide, in which the ammonia and carbon dioxide, which are not converted into urea, are recycled. The reaction product is freed from the major fraction of the unreacted ammonia by evaporation; and the ammonium carbonate formed is decomposed in two stages, in the first of which partial disassociation is effected by heat, and in the second of which disassociation is completed by counterflowing gaseous ammonia, the ammonia and carbon dioxide produced by the disassociation being absorbed in an ammoniated solution which contains essentially all the ammonia and carbon dioxide not converted into urea. This solution is recycled.

---

The present invention relates to a process for the synthesis of urea with a complete recycling of ammonia and carbon dioxide.

It is known that in the synthesis of urea from carbon dioxide and ammonia, the mixture of the reaction products, that is discharged from the reactor, contains always a portion of ammonium carbamate which has not been converted into urea and has to be recycled to the synthesis. As a quantity of ammonia is generally used, which exceeds the stoichiometrically needed amount, this excess of ammonia is found again in the mixture of the reaction products and must be recycled.

Ammonium carbamate and ammonia, which are present, must then be separated from the solution containing the produced urea and, generally, this operation is carried out by splitting the carbamate into its components and separating subsequently the gaseous phase: this essentially consists of ammonia and carbon dioxide.

Generally, the splitting of carbamate into ammonia and carbon dioxide is performed by causing the pressure to drop to values in the range between 10 and 45 kgs./sq. cm. and by administering the heat which is needed to support the splitting reaction.

A previous French patent by the same applicant, No. 1,356,508, is concerned with a process for the production of urea, wherein the splitting of ammonium carbamate is carried out at high pressures by treating the reaction products with gaseous ammonia.

Once ammonium carbamate and ammonia have been driven off of the urea-containing solution, the problem arises of recycling ammonia and carbon dioxide to the synthesis, in order that the starting reagents may be utilized in a virtually complete fashion.

A large number of processes, for splitting ammonium carbamate and recycling ammonia and carbon dioxide produced by said splitting, is known, these latter reagents being recycled either jointly or individually.

It has been suggested, for example, to blow the gases, produced by the decomposition of ammonium carbamate, within liquid ammonia so as to obtain a suspension of minute crystals of ammonium carbamate in liquid ammonia, but such a procedure exhibits the drawbacks inherent in the handling of suspensions. More particularly, the formation of deposits and crusts in the pump system and the high corrosive power induced by the carbamate have prevented this process from being put into commercial practice.

The recycling of ammonia and carbon dioxide in the form of a suspension of ammonium carbamate in oil has, in addition to the preceding ones, the drawback of the pollution of the urea so produced, and thus this process has been very seldom applied in practice.

Other known processes do away with said shortcomings by carrying out the recycling step by addition of water, possibly with ammonia, to the carbamate which has been formed anew from the splitting gases so as to lower the melting point thereof, thus forming an aqueous solution in which no solid components are present.

Since water has a definitely detrimental effect on the formation of urea by dehydration of the carbamate, the amount of water to be employed should be as limited as practicable.

In spite of the convenience of operating, for the synthesis reaction, with a recycled carbamate solution having a low water content, there are limits to this procedure, caused by the high temperatures at which the carbamate solution should be maintained in order that crystallization phenomena may be overcome.

By operating at high temperatures during progress of the carbamate-absorption step, it is moreover imperative to operate under high pressures, to maintain all the components of the solution in the condensed condition.

By so doing, difficulties are to be met, owing to the fact that the gases evolved by the splitting of the carbamate become available at pressures which, in any case, are lower than 45 kgs./sq. cm. in that the urea which is present in the carbamate-splitting stage places definite limits upon the temperature, and consequently upon the pressures, at which one is allowed to operate.

Summing up, the quantity of water which is required is somewhat high, at the expense of the urea yield.

On the other hand, the processes which provide for the separate recycling of ammonia and carbon dioxide impose a noticeable burden for the separation of the two components, which is generally carried out by selective absorption, and have thus negligible importance commercially.

Another important shortcoming which impairs all the known processes mentioned heretofore, and which stems from the low value of the pressure at which the carbamate-splitting gases become available, is the consequently great re-compression work which is required for recycling the unreacted components.

An object of the present invention is to produce urea by a process which requires a small amount of power for the recompression at recycling.

Another object of this invention is to synthesize urea with a single carbamate-recycling stage at high temperatures and high pressures, small quantities of water being present, with the consequence of high yields at each pass, so as to reduce the recycled quantities, along with recovering in its entirety and at a high thermal level, the heat of formation of the carbamate.

The complete utilization of the excess ammonia, both as a carbamate-decomposition agent and as a factor which encourages the improvement of the urea yield, is another object of the present invention.

Briefly, the process of the present invention allows urea to be produced with manufacturing costs which are definitely lower than those inherent in the heretofore known processes.

The process according to the present invention comprises the following step:

A synthesis autoclave is charged with fresh ammonia and carbon dioxide along with the recycle product in the form of ammonium carbamate in aqueous ammoniated solution, in such a proportion that the ratio of ammonia to carbon dioxide is definitely higher than the molar ratio of 2 to 1, while maintaining conditions suitable to the synthesis of urea.

The reaction product is then removed and is allowed to expand within a separator at pressures in the range 150–100 kgs./sq. cm., so as to set free a substantial portion of the unreacted ammonia contained in the reaction product.

The reaction product, thus freed of an important fraction of the unreacted ammonia, is brought to a primary "decomposer" for the carbamate, wherein, at pressures in the range 120–80 kgs./sq. cm., the carbamate is caused partially to decompose, said "decomposer" being equipped with means capable of keeping the thermal level of the splitting reaction at a suitable value.

The mixture flowing out of the primary decomposer, containing a small amount of ammonium carbamate, is then brought to a stripper in which, at pressures in the range 120–80 kgs./sq. cm., there is blown, in a counterflow relationship with respect to the reaction mixture, the gaseous ammonia which has been separated during the aforementioned expansion stage, while simultaneously administering the heat balance which is necessary for the completion of splitting the carbamate into ammonia and carbon dioxide.

Should the unreacted ammonia separated from the reaction product be in an amount insufficient to complete the splitting reaction of the carbamate within the stripper, said amount can be supplemented with fresh ammonia, this expedient being generally unnecessary in the normal production run. A complete splitting of the carbamate is thus obtained at pressures higher than 80 kgs./sq. cm., ammonia and carbon dioxide being available for recycling.

The urea solution, which virtually contains only ammonia, is then caused to expand in one or more stages at decreasing pressures for the recovery of ammonia, steam and ammonia being thus obtained which, condensed at 15–20 kgs./sq. cm., are recycled in the form of ammoniated solutions.

Ammonia and carbon dioxide, as produced by the decomposition of the carbamate, are absorbed by the aqueous ammoniated solution which has been obtained from the previous stage of separation of ammonia from the urea solution, an ammoniated solution of ammonium carbamate being thus formed. The heat of formation of the ammonium carbamate is resorted to for producing steam, on account of the high thermal level at which the heat becomes available. As a matter of fact, the high pressure at which ammonia and carbon dioxide become available, allows the absorption at high temperatures (higher than 150° C.), thus making available the heat ess differs from the other processes wherein absorption is carried out in more stages and at low pressures, thus evolved by the high thermal level absorption. This heat can be employed for the production of steam which can be used directly in the recycling step, and thus this proc-hindering or restricting the utilization of heat on account of the low thermal level at which heat is available.

It has been found, in fact, that, by adopting the process here outlined, it is possible to carry out the recycling of ammonia and carbon dioxide with an amount of water which is unexpectedly low and with a power consumption which is very limited with respect to that of the known processes, high urea yields per passage being thus obtained, along with definitely lower first costs.

In order that the process according to the invention may be better understood, a typical embodiment thereof will be disclosed, according to the accompanying drawing. Be it understood that many other embodiments of the invention are possible and that it is not intended to limit the invention to the case described in any wise.

In a reactor, 1, there are introduced ammonia through the piping 2, pump 3 and pre-heater 4, carbon dioxide through the piping 5, and the compressor 6, and the recycle, formed by carbamate in an aqueous ammoniated solution, through the piping 7 and the pump 8, in such a proportion that the molar ratio of ammonia to carbon dioxide ranges between 3 to 1 and 5 to 1.

The autoclave is kept at a pressure from 180 to 300 kgs./sq. cm. and at a temperature between 180° C. and 240° C. The product of the reaction is discharged, through the conduit 9, and allowed to expand through the valve 10 at a pressure of between 150 and 100 kgs./sq. cm., to be then introduced in a separator 11 in which the major portion of the unreacted ammonia is set free. The solution of urea freed of a major fraction of unreacted ammonia is introduced, through the piping 12 and the valve 13, into the primary decomposer 14 for the carbamate.

Within the decomposer 14, equipped with means, 15, for administering heat to the decomposition reaction, the first splitting of the carbamate is caused to occur at pressures in the range of 120–80 kgs./sq. cm. and at temperatures ranging from 150° C. and 200° C. Within this primary decomposer there occurs the decomposition of a fraction of the carbamate which is between 20% and 40% of the carbamate which is present in the reaction products.

From the separator 11, via the piping 16 and the valve 17, the separated ammonia is sent to the secondary decomposer 18, along with possible fresh ammonia supplied via the conduit 19 the valve 20 at pressures ranging from 120 to 80 kgs./sq. cm.

Within the secondary decomposer 18, fitted with means 21 to administer heat to the decomposition reaction, the completion of the carbamate splitting takes place at pressures ranging from 120 and 80 kgs./sq. cm. and at temperatures between 150° C. and 200° C.

The gaseous ammonia, through the input 22 placed near the bottom of the secondary decomposer 18, is counterflowed with respect to the liquid phase fed in through the conduit 23 in the uppermost part of the decomposer 18.

The solution of urea, substantially carbamate-free, is discharged via the conduit 24, allowed to expand in the valve 25 and introduced into the separator 26 where, at pressures in the range 15–25 kgs./sq. cm., a fraction of the ammonia contained in the solution is separated in the gaseous state (between 50% and 80% of the total ammonia which is present in the solution flowing out of the decomposer 18).

The vapours produced by the decomposer 18, which are available at a pressure between 120 and 80 kgs./sq. cm., are introduced, via the conduit 27, into the absorber 28 fitted with a heat exchanger 29 for recovering the heat evolved in the absorption and in the reaction of carbamate reforming, in the form of intermediate-pressure steam.

Within said absorber 28, at pressures between 120 and 80 kgs./sq. cm., and at temperatures in the range 140° C.–170° C., there is introduced an ammoniated solution, as an absorbing agent, through the conduit 30 and within said solution ammonium carbamate is formed again thus constituting the aqueous ammoniated recycle solution which, via the conduit 7, and the pump 8, is recycled towards the reactor 1.

The water content or said solution ranges from 5% and 16% by weight of the total solution.

The ammonia which has been separated in separator 26, along with the inert gases discharged from the absorber 28 via the conduit 31 and the valve 32, is forwarded, through the conduit 33, to the rectification column 34 which operates at pressures of from 15 to 25 kgs./sq. cm., wherefrom ammonia and inert gases are obtained as head products.

This head product is brought, via the conduit 35, to the condenser 36 wherein ammonia is liquefied and the inert gasses stripped and removed through the conduit 37.

Liquid ammonia is partly recycled towards the synthesis through the conduit 38, and partly is introduced as a reflux into the column 34, via the conduit 39.

The residue of the rectification is formed by an aqueous solution of ammonia which is utilized as an absorption agent in the absorber 28 through the conduit 30 and the pump 40.

The aqueous solution of urea, coming from the separator 26 and still containing residual dissolved ammonia, is discharged via the conduit 41, allowed to expand through the valve 42 at pressures between 0.6 and 1.0 kg./sq. cm. (abs. pressures), heated in the evaporator 43 and fed into the separator 44 wherein the residual ammonia and a portion of the water contained in the solution are separated in vapour form at temperatures between 80° C. and 130° C., whereas the solution of urea (already partially concentrated) is sent, via the piping 45, to the subsequent treatments.

The vapour phase coming out of separator 44 is forwarded, through the conduit 46, to the condenser 47, wherein the water which is present is condensed at a temperature of from 30 to 50° C. and is sent back, through the pump 48 and the conduit 49, as a secondary reflux, to the column 34.

The remaining gaseous phase essentially consisting of ammonia, is sent back to the condenser 36, via the conduit 50 and the compressor 51.

In the carbamate decomposition system described above the heat which is necessary for the dissociation of the carbamate is supplied in two distinct apparatuses.

The exchanger, which forms the first part of the carbamate decomposition system, can be consolidated with the second decomposer, thus forming a single apparatus. This allows obtaining the same processing results, but is conducive to a greater overall cost of the system, in that, in the two-stage system as described above, the first stage can be achieved by a conventional heat exchanger, whereas the second stage requires a solution which is economically more burdensome.

An exemplary embodiment of the process is reported below without implying any limitation.

Example

In a system according to the flow diagram depicted in the accompanying drawing the process of the invention is put into practice by operating according to the data of Table 1: this latter contains both the working conditions and the composition, on a weight basis, of the streams flowing between the apparatuses.

The reference numerals refer to the already described drawing.

TABLE 1

| | 1 | 2 | 5 | 7 | 9 | 11 | 12 | 14 | 16-22 |
|---|---|---|---|---|---|---|---|---|---|
| | | | | Percent, Basis Weight | | | | | |
| Urea | | | | | 34.4 | | 40.1 | | |
| $NH_3$ | | 100 | | 43.45 | 36.1 | | 25.5 | | 100 |
| $CO_2$ | | | 100 | | | | | | |
| $H_2O$ | | | | 10.12 | 13.8 | | 16.1 | | |
| Carbamate | | | | 46.43 | 15.7 | | 18.3 | | |
| Total | | 100 | 100 | 100.00 | 100.0 | | 100.0 | | 100 |
| Temp., ° C | 190 | | | | | 180 | | 170 | |
| Press., kgs./sq. cm | 220 | | | | | 120 | | 100 | |

| | 18 | 23 | 24 | 26 | 27 | 28 | 30 | 33 | 38 |
|---|---|---|---|---|---|---|---|---|---|
| | | | | Percent, Basis Weight | | | | | |
| Urea | 40.1 | 46.0 | | | | | | | |
| $NH_3$ | 28.2 | 35.7 | | | 67.5 | | 61 | 92.62 | 100 |
| $CO_2$ | 3.8 | | | | 32.08 | | | | |
| $H_2O$ | 16.0 | 18.3 | | | 0.42 | | 39 | 7.38 | |
| Carbamate | 11.9 | | | | | | | | |
| Total | 100.0 | 100.0 | | | 100.00 | | 100 | 100.00 | 100 |
| Temp., ° C | 190 | | | 150 | | 155 | | | |
| Press., kgs./sq. cm | 100 | | | 17 | | 100 | | | |

| | 41 | 44 | 45 | 46 | 47 | 49 | 50 | 2+5+38+7 |
|---|---|---|---|---|---|---|---|---|
| | | | | Percent, Basis Weight | | | | |
| Urea | 69.64 | | 76.9 | | | | | |
| $NH_3$ | 6.56 | | | 69.18 | | 27.1 | 100 | 55.68 |
| $CO_2$ | | | | | | | | 25.23 |
| $H_2O$ | 23.8 | | 23.1 | 30.82 | | 72.9 | | 3.44 |
| Carbamate | | | | | | | | 15.65 |
| Total | 100.00 | | 100.0 | 100.00 | | 100.0 | 100 | 100.00 |
| Temp., ° C | | 110 | | | 40 | | | |
| Press., kgs./sq. cm | | 1 (abs.) | | | 1 (abs.) | | | |

The embodiments of the invention in which an exclusive property or privilege is claimed are defined as follows:

1. A process for the production of urea by synthesis from ammonia and carbon dioxide with total recycling at high temperatures and pressures of those portions of the ammonia and carbon dioxide which have not been converted into urea, comprising freeing the reaction product of a major fraction of the unreacted ammonia in a separation stage by evaporation at a pressure of 120–150 kgs./sq. cm., and decomposing the ammonium carbamate formed during the reaction, at a pressure of 80–120 kgs./sq.cm. in a dissociation system comprising two stages, in the first of which a partial dissociation by the action of heat is effected whereas in the second stage said dissociation is completed by the action of gaseous ammonia injected in counterflow, and absorbing the ammonia and carbon dioxide produced by the dissociation in ammoniated solution at a pressure of 120–80 kgs./sq.cm., thereby yielding an aqueous ammoniated solution of ammonium carbamate which essentially contains all the ammonia and carbon dioxide which have not been converted into urea, and recycling said solution.

2. A process for the production of urea according to claim 1, wherein the gaseous ammonia utilized in the second stage of the dissociation system is the one obtained from the stage of separation by evaporation.

3. A process for the production of urea according to claim 1, wherein the carbamate-free solution is concentrated in one or more stages by separating a vapour phase which, condensed and rectified, gives a weakly ammoniated solution, which is utilized for the absorption, and a substantially pure ammonia phase which is recycled.

4. A process for the production of urea according to claim 1, wherein the absorption of ammonia and carbon dioxide, flowing in the gaseous state from the dissociation of ammonium carbamate, is carried out at temperatures comprised between 140° C. and 170° C.

5. A process for the production of urea according to claim 1, wherein the ammoniated aqueous solution of ammonium carbamate which is recycled has a water content ranging from 5% and 16% by weight with respect to the total solution.

6. A process for the production of urea according to claim 1, wherein the gaseous ammonia utilized in the second stage of the dissociation system is partially formed by fresh-fed ammonia.

References Cited

UNITED STATES PATENTS

| | | | |
|---|---|---|---|
| 3,193,353 | 7/1965 | Matile et al. | 260—555 |
| 3,090,811 | 5/1963 | Otsuka et al. | 260—555 |

LEON ZITVER, Primary Examiner

M. W. GLYNN, Assistant Examiner